United States Patent
Ifrim (10) Patent No.: US 10,263,547 B2
(45) Date of Patent: Apr. 16, 2019

(54) PERMANENT MAGNET MOTOR CONTROL FOR ELECTRIC SUBSEA PUMP

(71) Applicant: DIRECT DRIVE SYSTEMS, INC., Fullerton, CA (US)

(72) Inventor: Costin Ifrim, Fullerton, CA (US)

(73) Assignee: Direct Drive Systems, Inc., Fullerton, CA (US)

( * ) Notice: Subject to any disclaimer, the term of this patent is extended or adjusted under 35 U.S.C. 154(b) by 22 days.

(21) Appl. No.: 15/517,208

(22) PCT Filed: Oct. 9, 2015

(86) PCT No.: PCT/US2015/054962
§ 371 (c)(1),
(2) Date: Apr. 6, 2017

(87) PCT Pub. No.: WO2016/057934
PCT Pub. Date: Apr. 14, 2016

(65) Prior Publication Data
US 2017/0302202 A1    Oct. 19, 2017

Related U.S. Application Data

(60) Provisional application No. 62/062,040, filed on Oct. 9, 2014.

(51) Int. Cl.
*H02P 1/46* (2006.01)
*H02P 6/20* (2016.01)
*E21B 43/01* (2006.01)

(52) U.S. Cl.
CPC .............. *H02P 6/20* (2013.01); *H02P 1/46* (2013.01); *E21B 43/01* (2013.01)

(58) Field of Classification Search
CPC .................................. H02P 6/20; E21B 43/01
(Continued)

(56) References Cited

U.S. PATENT DOCUMENTS 8,400,093 B2 * 3/2013 Knox .................. H02P 3/00
                                                              318/255
9,300,239 B2 * 3/2016 Hart .................. H02P 25/022
(Continued)

FOREIGN PATENT DOCUMENTS

CN        203278710        11/2013
WO    WO 2011/019334        2/2011

OTHER PUBLICATIONS

International Search Report and Written Opinion of the International Searching Authority issued in International Application No. PCT/US2015/054962 dated Mar. 1, 2016; 13 pages.
(Continued)

*Primary Examiner* — Eduardo Colon Santana
*Assistant Examiner* — Devon Joseph
(74) *Attorney, Agent, or Firm* — Fish & Richardson P.C.

(57) ABSTRACT

A method includes monitoring electrical output in an open control loop from a variable speed drive to a remote permanent magnet motor, the variable speed drive electrically connected to the permanent magnet motor via a power transmission line. The method includes, in response to detecting a variation in the electrical output at the variable speed drive, synchronizing a frequency of a rotor shaft of the permanent magnet motor with a constant electromagnetic field frequency of a stator of the permanent magnet motor for a predetermined period of time. After the predetermined period of time, the method includes increasing the electromagnetic field frequency of the stator to an operational frequency threshold to accelerate the frequency of the rotor shaft of the permanent magnet motor. In response to reaching the operational frequency threshold, the method includes determining an internal position of the rotor based on the variable electromagnetic field frequency.

23 Claims, 5 Drawing Sheets

(58) Field of Classification Search
USPC .......................................................... 318/400
See application file for complete search history.

(56) References Cited

U.S. PATENT DOCUMENTS

| | | | | |
|---|---|---|---|---|
| 2011/0010961 A1* | 1/2011 | Wehrheim | ............... | D06F 58/04 |
| | | | | 34/549 |
| 2011/0020144 A1* | 1/2011 | McClendon | ............ | F04B 17/05 |
| | | | | 417/53 |
| 2011/0050144 A1* | 3/2011 | Knox | ................... | E21B 47/0007 |
| | | | | 318/490 |
| 2014/0117905 A1* | 5/2014 | Hart | ....................... | H02P 25/022 |
| | | | | 318/400.42 |
| 2017/0088072 A1* | 3/2017 | Curtis | ................... | G08B 21/182 |

OTHER PUBLICATIONS

Reigosa, David et al.; "Sensorless Control of Doubly-Fed Induction Generators Based on Rotor High Frequency Signal Injection"; IEEE Energy Conversion Congress and Exposition; Sep. 15, 2012; pp. 2268-2275.

International Preliminary Report of Patentability issued in International Application No. PCT/US2015/054962 dated Sep. 28, 2016; 18 pages.

* cited by examiner

FIG.4B

PERMANENT MAGNET MOTOR CONTROL FOR ELECTRIC SUBSEA PUMP

CLAIM OF PRIORITY

This application is a U.S. National Stage of PCT/US2015/054962 filed on Oct. 9, 2015, which claims priority to U.S. Provisional Application No. 62/062,040 filed on Oct. 9, 2014, the entire contents of which are hereby incorporated by reference.

BACKGROUND

The present disclosure relates to subsea pump motor control, for example, control of electrical power flow on a permanent magnet motor in a subsea pump system located at a considerably long distance from the power source, and more particularly to a method and apparatus for starting up and controlling the torque speed characteristic of a such motor load system, specifically a subsea motor-pump system, driven by an on-shore drive in the absence of closed loop sensors at the subsea location.

Most subsea control of subsea pumps are based on induction motor driven systems. Some challenges raised by a permanent magnet motor, specifically a surface mounted magnet design, are related to the presence of an existing magnetic field in the rotor and the difficulty to synchronize, in the absence of a rotor position control sensor, the rotor position with respect to stator excitation defined by current and phase settings of a variable frequency or speed drive (VSD). One aspect that was also extensively debated in technical papers, is the possibility of a rotor back and forth oscillation during the startup and its impact on the power flow. While some of these theoretical aspects were debated in published technical papers, the methodology and algorithms of how to accomplish these were not yet known.

In some instances the startup currents for induction machines are, when there is present a breakout torque, in excess of the steady state operational requirements for those torque/speed motor pump characteristics. The possibility of saturating the transformers part of the transmission line leads to an over sizing of these components.

DESCRIPTION OF DRAWINGS

Like reference symbols in the various drawings indicate like elements.

DETAILED DESCRIPTION

Sometimes, startup currents for induction machines are in excess of steady state operational requirements for motor pump characteristics regarding torque and speed, for example, especially when there is a breakout torque present for the motors. The possibility of saturating transformers along a transmission line between a VSD and a subsea pump can lead to an over-sizing of components. Accordingly, a method is provided for a long line startup of a permanent magnet motor, incorporating transformer saturation limitations, and torque/speed control during and after a completion of the startup.

A method for starting permanent magnet motors over a long distance from a power source and control, based solely on the information available at a variable frequency or speed drive (VSD), the power source, a rotor relative position to the excitation electromagnetic field in the stator is determined. The absence of rotor positional sensors and voltage and/or current sensors at the permanent magnet motor terminals can be addressed by control algorithm at the VSD. The method is a three step process, including a startup process based on an open loop constant frequency, defined by a ramped up injected current at the said constant frequency, controlled injected current and ramped up frequency, and a closed loop sensorless vector control. The three sensorless control steps are based at least in part on the characteristics of the permanent magnet motor mechanical load system, such as the inertial moment of the permanent magnet motor-coupling-pump system, the maximum current, in some instances defined by the electric power transmission limitations, the startup frequency of the motor load system, the minimum time during which the startup mentioned frequency is kept constant and, in the second step, the variation of the current and frequency as a predetermined functions of time. It also includes a frequency threshold, which triggers the control system, at the third stage, to switch from an open loop frequency/current time functions mode into a sensorless, closed loop vector controlled mode. In some implementations, the method allows the permanent magnet motor to start in the presence of breakout torques, as present in most motor-pump applications. In such instances, the threshold frequency is set in the torque speed characteristic at a frequency higher than the startup frequency and a torque equal or higher than the breakout torque, which can be identified by the system based on the VSD terminal values.

In some instances, long power lines between a VSD and a subsea motor io pump system are typical to subsea applications where the VSD is remotely located, for example, several kilometers away from the subsea motor pump systems. These long power lines may include one or more (e.g., two) transformers, such as a top side and a subsea transformer. The startup current and frequency limitation can be a function of the magnetic core saturation of the transformers and/or the power lines. Startup and torque control of the method can be applied also to synchronous permanent magnet motor with surface mounted permanent magnets design. In such instances, rotor saliency is virtually inexistent, for example, because there are substantially un-detectable and un-measurable differences between direct and quadratic rotor inductances in the rotor reference frame of the rotor, which is an additional factor in determining an accurate rotor position.

Figure 1:
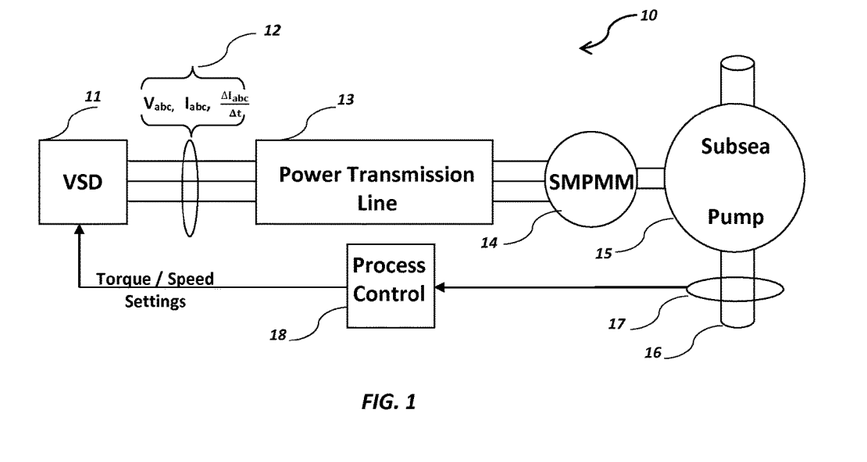
FIG. 1 is a schematic view of an example subsea pump system.

The method can be applied to a system such as the example subsea pump system 10 depicted in FIG. 1. The example system 10 includes a multiphase variable speed drive, VSD 11, that includes instrumentation at its output terminals 12 capable to monitor the terminal voltages, currents, and their variations in time (e.g., current variation in time, voltage variation in time, and/or other), a power transmission line 13 (e.g., a subsea multiphase umbilical), and a subsea permanent magnet motor 14. The permanent magnet motor 14 mechanically drives through a shaft the load 15, for example, a subsea boosting pump. The subsea boosting pump can be defined by a system functional characteristic of shaft torque/speed 16 monitored through a set of flow and pressure meters 17 by a process controller 18 that sends to the VSD data regarding operational motor shaft torque as a proportional current value and speed/frequency settings. In some instances, the power transmission line 13 includes one or more transformers, for example, to minimize power losses along a length of the transmission line.

Figure 2:
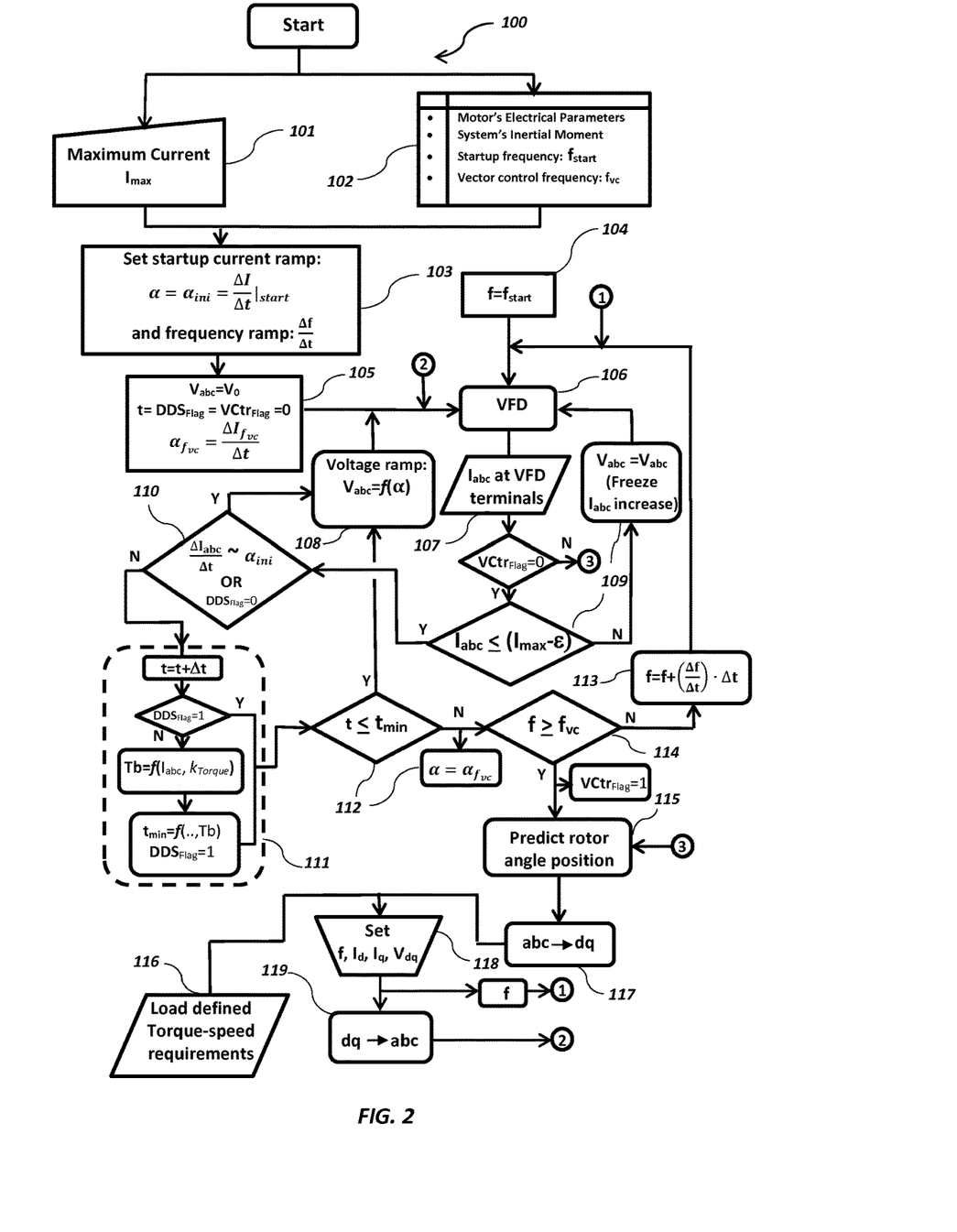
FIG. 2 is a flowchart describing an example method for starting a permanent magnet motor.

During the startup and, subsequently, the operational mode described above, an example flowchart 100, described in FIG. 2, is implemented.

The flowchart 100 includes the evolutionary control in time of three stages: the first stage, the start up from a stationary, zero speed, is captured in the flowchart 100 by the steps 101-112, and is characterized by the settings at the VSD 11 as constant frequency and constantly increased generated current based on predefined multiphase current as a function of time variation (for example, a constant current/time ramp). The current profile in time is continuously monitored by the output terminals 12 (e.g., the instrumentation at the terminals 12) as the VSD is, in most instances, a multiphase voltage type source. The current ramp generally follows the output voltage ramp generated at the VSD's terminals 12. It is assumed that there is a break out torque that has to be exceeded so that the rotor will start spinning Once the rotor starts to spin the current ramp profile is distorted indicating, for example, by sensor monitors at terminals 12, that the motor torque exceeded the breakout torque, Tb. In some instances, the breakout torque value is determined from the values of the current and voltage measurements at the terminals of the variable speed drive at the moment the condition 110 is no longer satisfied. This triggers the second stage of the control, still part of the startup mechanism and described by the steps 111-113. Once the breakout torque is reached, its value is determined based on the current values at the VSD terminal 12 processed at the time the breakout torque is sensed and the torque current constant value that is a motor electrical parameter as defined in 102. This process that is based on the settings of VSD at a defined current function in time and constant frequency/speed ramp. Since the permanent magnet rotor can oscillate before synchronizing with the speed/frequency settings, the second stage continues for a predetermined length in time that is determined based at least in part on four critical factors: system breakout torque, system inertial moment, maximum allowable current values, and current ramp in time. The third stage is triggered once the speed/frequency reaches a predefined value and the control system switches from the open loop control that defines the first two stages, to a closed control loop, or vector control at the third stage, as described by the steps 115-119.

The third stage is the one considered to be the operational one based on which the process is controlled by the process controller 18, as described in FIG. 1.

Figure 3A:
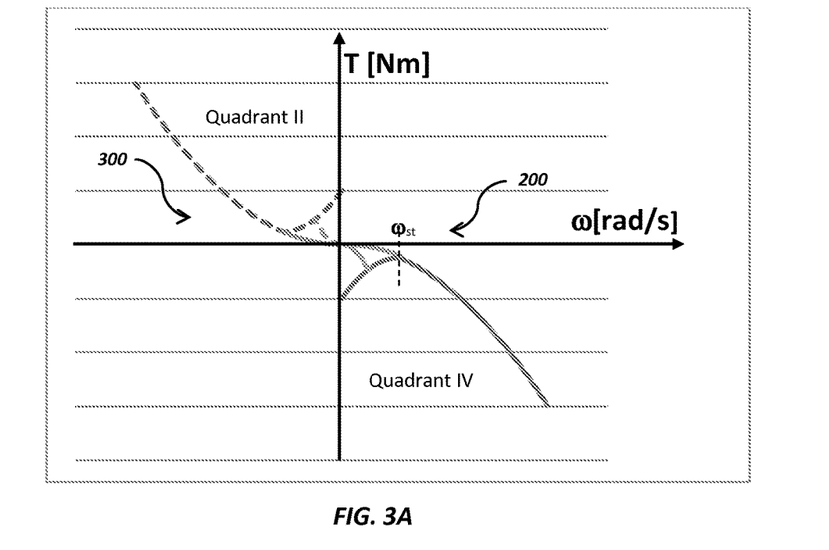
FIGS. 3A, 3B and 3C are graphs illustrating example load characteristic data for a permanent magnet motor shaft torque speed reference system.

In some instances, the flowchart 100 of FIG. 2 operates in the following sequence: at 101, a maximum level of the current, defined by the system restrictions, is set as $I_{max}$. At 102, the system electrical and mechanical characteristics are defined, for example, as the long line and motor equivalent schematics, permanent magnet motor torque-current constant and system inertial moment. Typical load characteristics 200 and 300 are depicted in FIG. 3A, and detailed in FIG. 3B as described in the fourth quadrant, and detailed in FIG. 3C as described in the second quadrant of the graph of shaft torque (T) 201 as a function of shaft speed (ω) 202. When the oscillating, around the zero value, ramped up in time electromagnetic torque exceeds the value of the break up torque (Tb), located on either the positive 203 (in FIG. 3B), or the negative 303 (in FIG. 3C), torque (T) axis, the accumulated potential energy in the rotor is released on a typical profile as 204 or 304. As an example, if 206 is defined by the coordinates ($\omega_{st}$,Tr) then, a typical function for 204 is $$T(\omega) = -\frac{(Tb - Tr) \cdot (\omega - \omega_{st})}{\omega_{st}^2} - Tr \tag{1}$$

Figure 3B:
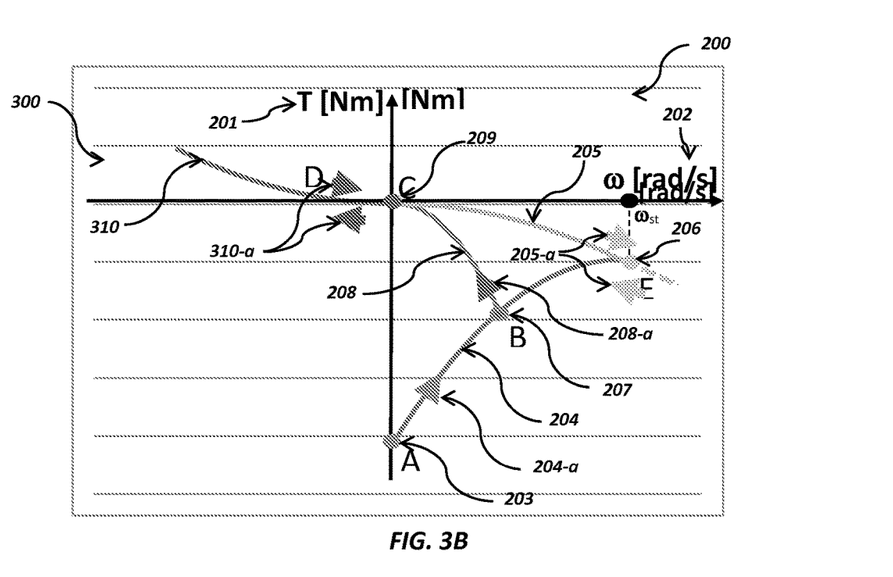
Figure 3C:
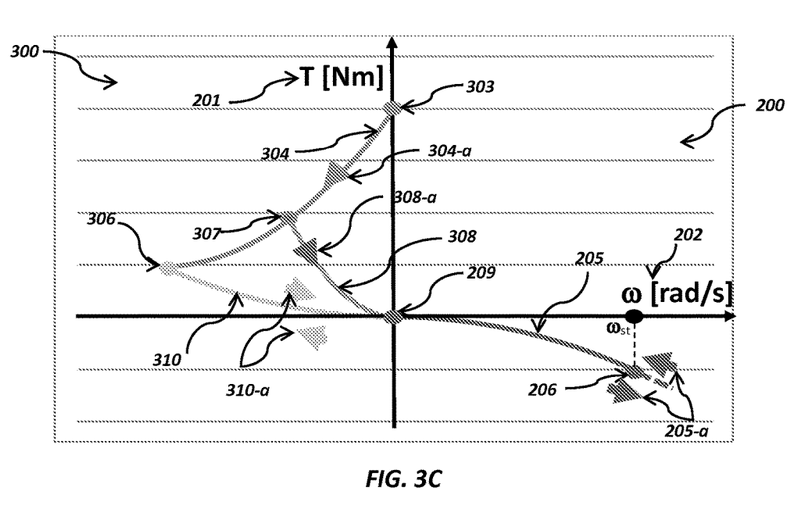

A symmetric function, in quadrant II of FIG. 3A and as in FIG. 3C, based on the motor shaft torque speed reference system, defines 304 relative to 306. The startup frequency is defined relative to quadrant IV of the torque speed characteristic of the load represented in the motor reference system for which the electromagnetic torque is positive, the load torque is negative and the shaft speed is positive. The value of $f_{start}$ ($\omega_{st}$=2·π·$f_{start}$) is determined from this torque (T) speed (ω) characteristic, 204, with the load torque decreasing from the breakout torque value 203, following the direction indicated by the arrow 204-a, and pump load characteristic, 205 in the junction points 206 and, in some instances when the mechanical load connected to the motor shaft is a pump, $$T(\omega) = k_{pump} \cdot \omega^2 \tag{2}$$

with $k_{pump}$ the pump constant, and with ($\omega_{st}$,Tr) as defined by the intersection between equations (1) and (2) where Tr complies with the equation (3)

$$\left.\frac{dT}{d\omega}\right|_{\omega_{st}} = 0 \tag{3}$$

A minimum time needed for the system, after breaking up the torque, to overcome rotor oscillations for a given constant operating start up shaft frequency, $t_{min}$ is determined as a function of the system, motor and load combined, inertial moment, J, the constant shaft frequency $f_{start}$, the current ramp $$\frac{\Delta I_{a,b,c}}{\Delta t}:$$

$$t_{min} = f\left(J, f_{start}, \frac{\Delta I_{a,b,c}}{\Delta t}\right) = t_{min1} + t_{min2} + t_{min3} \tag{4}$$

In some instances, as part of the first stage control, the minimum time required for the startup to be completed is based on three intervals of time as depicted by the equation (4). The first time interval, $t_{min1}$, is a time interval required for the rotor to follow the 204 or 304 curve up to the moment of reaching 207 or 307, respectively. This interval of time is maximized when 207 or 307 is in the proximity of, or overlaps, 206 or 306, respectively. The second time interval, $t_{min2}$, is the time required for the oscillation around (ω=0, T=0), along 205 and 310. The third time interval, $t_{min3}$, is the time required for the shaft oscillations around the startup operational point ($\omega_{st}$,Tr), 206 to be damped. In some instances, this time interval $t_{min3}$ has its value determined when the following two instances are met: the speed ω is stabilized within 1% of $\omega_{st}$, or when relation (5) is satisfied $$t_{min3} = 4 \cdot \tau_{syst} \tag{5}$$

with the mechanical natural time constant of the system, $\tau_{syst}$, a system mechanical parameter and the initial peak to peak amplitude of the speed oscillation, $\omega_{pp}$, satisfies the relation (6).

$$\omega_{pp} = 2 \cdot \omega_{st} \qquad (6)$$

Figure 4A:
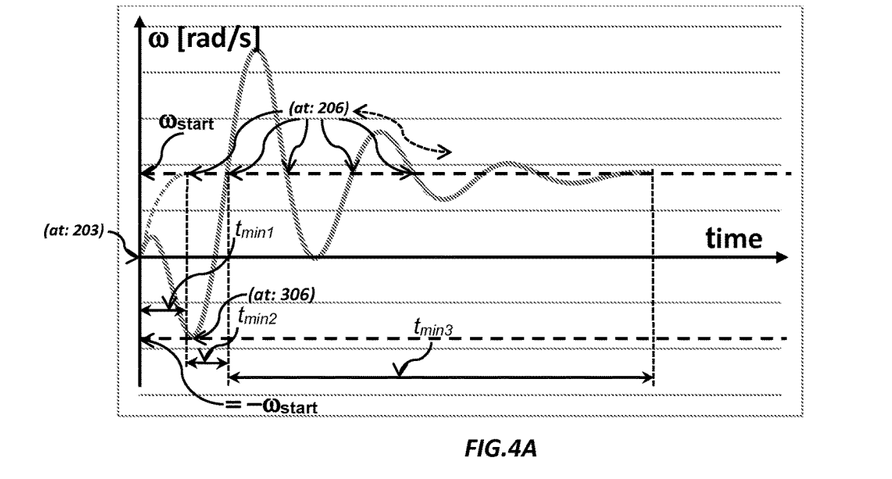
FIGS. 4A and 4B are two graphs illustrating movement of an example rotor over time during startup.
Figure 4B:
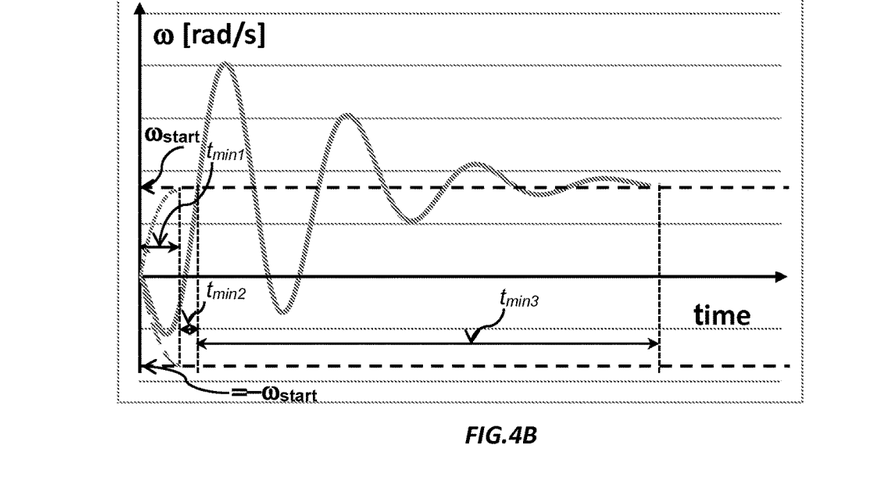

The balance between the current ramp and the maximum current limits value settings determine the length of this additional damping time as depicted in FIG. 4A and FIG. 4B.

In some instances $t_{min1}$ is determined as the positive real root of the resultant polynomial equation defined by the definite integral equation (7) with the integrant as defined by equation (1) for Quadrant IV FIG. 3A and FIG. 3B or its correspondent path defined by 304 in FIG. 3C $$\int_0^{t_{min1}} T(\omega) \cdot \omega \cdot dt = \frac{1}{2} \cdot J \cdot \omega_{st}^2 \qquad (7)$$

A conservative, longer, $t_{min}$, overall interval of time provides a smoother transition from the first sensorless startup control stage to the second sensorless control stage. Relation (7) is a conservative estimate value for $t_{min1}$, because of the first assumption that 207 and 206 overlap and the second assumption that the damping effect on the rotor movements in the presence of the electromagnetic field of the stator, during the interval of time $t_{min1}$, is neglected.

In some instances, the values of $t_{min2}$ and $t_{min3}$ are determined from the equation (8) where B is the damping coefficient of the combined system bearings and coolant fluid viscosity present in the pump and motor gap, and k(t) is a function dependent of the electric motor gap force that links the stator and the rotor. In some instances this parameter is expressed as in equation (9) as the ramped torque in time, an overall system constant, $\gamma$, a motor torque constant, $k_{Torque}$, the electromagnetic torque per current unit and the current ramp up in time value, $$Ramp_{crt} = \frac{\Delta I_{a,b,c}}{\Delta t} \text{ and } \varphi$$

is a randomly selected rotor position.

$$\frac{d^2\omega}{dt^2} + \frac{B}{J}\frac{d\omega}{dt} + \frac{k(t)}{J} \cdot \omega = 0; \quad \omega_{(t=0)} = \omega_{ini} \qquad (8)$$

$$k(t) = \gamma \cdot T(t) = \gamma \cdot k_{Torque} \cdot Ramp_{crt} \cdot t \cdot \sin(6 \cdot \pi \cdot f_{start} + \varphi) \qquad (9)$$

The intervals of time $t_{min2}$ and $t_{min3}$ are obtained from the relation (8) by applying the initial conditions for the damped oscillations $\omega_{ini}=0$ for $t_{min2}$ and at $\omega_{ini}=\omega_{st}$ for $t_{min3}$. A ramp up value for the shaft frequency, applied during the method's second stage, after the time counter 111, exceed $t_{min}$, is also defined as $$\frac{\Delta f}{\Delta t}.$$

First Control Stage:

Referring back to the flowchart 100 of FIG. 2, the value of $f_{vc}$, ($f_{vc} > f_{start}$) the shaft frequency at which the control is switched to a closed loop mode is also set. Based on commonly known motion equations the parameters in 103 are determined. The settings for the VSD, 106, during the first stage are set by the constant frequency, 104, and a ramped up voltage setting starting from an initial $V_0$ value, 105, with respect to the current ramp settings, 108. The control of the current ramp through the voltage settings is done through the readings from 12, as defined in the flowchart by 107. The values of the current injected by the VSD are continuously monitored by 109 such to be within the limits set in 101. The process of continuously increasing the current while holding a constant electromagnetic field frequency, $f_{start}$, continues up to the moment 110 detects a variation in the current ramp. This variation in the current ramp indicates the movement of the rotor due to the presence of its induced permanent magnet based voltage. In some instances this movement indicates that the breakout torque that held the rotor locked at zero speed, is equalized or exceeded by the electromagnetic torque. Once the rotor spins the timer is set to record time, 111, in some instances the breakout torque value is computed from the known motor parameter $k_{Torque}$, and the synchronization between the rotor shaft frequency and the stator constant rotational electromagnetic field frequency is targeted by an increased electromagnetic link by the current ramp, set in 103, while keeping the process active for a period of time equal to $t_{min}$, 112.

Second Control Stage:

After reaching the $t_{min}$, the time set to ensure the rotor/stator synchronization for the shaft $f_{start}$ frequency, the second, 113, stage is activated by accelerating the shaft frequency, $$\frac{\Delta f}{\Delta t} > 0,$$

in open control loop by keeping the injected current ramp, $Ramp_{crt} \geq 0$, 108 active. In some instances the injected current ramp is different from the start up current ramp defined in 103.

Third Control Stage:

When the shaft frequency reaches the vector control set value 115, the third stage, a closed loop sensorless control is activated. In some instances a constant current value being acceptable ($Ramp_{crt}=0$) in which instance the sensorless closed control loop will be activated, on the torque speed characteristic at ($\omega_v$,Tb), with $\omega_v > \omega_{st}$, at a torque value within an acceptable margin of error of the value of Tb. The estimated rotor position, $\varphi$, is determined, for example, such that a Park transformation can be applied to determine the currents in the rotor reference system. These values, obtained from 107 and collected from 12 and combined with the controller settings 116 and 18, provide the operational control of the process.

In view of the discussion above, certain aspects encompass a method including monitoring electrical output in a sensorless control loop from a variable speed drive to a remote permanent magnet motor, the variable speed drive electrically connected to the permanent magnet motor via a power transmission line. In a first step, the method includes presetting a constant field frequency for a predetermined period of time. In response to detecting a variation in the electrical output at the variable speed drive, the method includes synchronizing a frequency of a rotor shaft of the permanent magnet motor with a constant electromagnetic field frequency of a stator of the permanent magnet motor for a predetermined period of time. In a second step, the method includes accelerating, after reaching the predetermined period of time, the rotor shaft speed by increasing the electromagnetic field frequency of the stator up to a preset operational frequency threshold. In response to reaching the preset operational frequency threshold of the electromagnetic field frequency of the stator, in a third step, the method includes determining an internal position of the relatively synchronized spinning rotor with respect to the variable electromagnetic field frequency.

Certain aspects encompass a method including monitoring electrical output in an open control loop from a variable speed drive to a remote permanent magnet motor, the variable speed drive electrically connected to the permanent magnet motor via a power transmission line. The method further includes, in response to detecting a variation in the electrical output at the variable speed drive, synchronizing a frequency of a rotor shaft of the permanent magnet motor with a constant electromagnetic field frequency of a stator of the permanent magnet motor for a predetermined period of time. After the predetermined period of time, the method includes increasing the electromagnetic field frequency of the stator to an operational frequency threshold to accelerate the frequency of the rotor shaft of the permanent magnet motor. In response to reaching the operational frequency threshold, the method includes determining an internal position of the rotor based on the variable electromagnetic field frequency.

Certain aspects encompass a system including a variable speed drive including output terminals to monitor an electrical signal over time, a subsea permanent magnet motor coupled to a shaft, a power transmission line electrically connecting the multiphase variable speed drive and the subsea permanent magnet motor, and a process controller configured to transmit operational data of the shaft to the variable speed drive, the operational data including operational motor torque of the shaft. The output terminals monitor the electrical signal over time between the variable speed drive and the subsea permanent magnet motor to determine a position of the shaft of the permanent magnet motor.

The aspects above can include some, none, or all of the following features. The method can include operating the permanent magnet motor having non-detectable rotor saliency due to un-detectable and un-measurable differences between direct and quadratic rotor inductances in the rotor reference frame. The permanent magnet motor ca be connected to a subsea pump. Monitoring electrical output can include monitoring current and current rate over time, and detecting a variation in the electrical output can include detecting a variation in the current and current rate over time at output terminals of an on shore power supply. The method can include supplying a continually increased current in time to the permanent magnet motor at a constant electromagnetic field frequency of the stator determined on the basis of the mechanical motor and pump parameters. The method can include determining a mechanical load break out torque value of the permanent magnet rotor by detecting an unlocking of a permanent magnet rotor movement in response to detecting a variation in the electrical output at the variable speed drive. Monitoring electrical output can include monitoring electrical motor performance of the permanent magnet motor by monitoring current and current rate over time, and detecting variation in the electrical output can include detecting a variation in the current and current rate over time, where detecting variation in the current and current rate over time limits the maximum current flow in the system during startup at maximum the rated values for the operational mechanical load when a break out torque of the load is equal to or less than a rated operational torque. The constant electromagnetic field frequency of the stator can be determined based on the mechanical motor and pump parameters and an estimated break out torque of the load. The predetermined period of time for the synchronization of the frequency of an unlocked rotor shaft of the permanent magnet motor with the constant electromagnetic field frequency of the stator is determined based on the break out torque of the load and the mechanical motor and pump parameters. Synchronizing the frequency of the rotor shaft of the permanent magnet motor with the constant electromagnetic field frequency of the stator can include supplying, by the variable speed drive, a predetermined current value as function of time to the permanent magnet motor for the predetermined period of time, where the predetermined time period is based on a predetermined constant electromagnetic frequency, a maximum allowable current of the power transmission line, and the mechanical motor and pump parameters. The operational frequency threshold can correspond to a closed loop control of the permanent magnet motor, the operational frequency threshold based on a maximum allowable current of the power transmission line, a predetermined current value as a function of time and a predetermined frequency value increased as a function of time with an initial value for the frequency and an initial value for the current at its values at the end of the predetermined time interval. The control loop can be a sensorless control loop. The method can include, in response to reaching a reasonably stable rotor frequency at the operational frequency threshold, switching the sensorless control loop from an open control loop to a closed control loop. Monitoring electrical output can include monitoring electrical motor performance of the permanent magnet motor by monitoring current and current rate over time, and detecting variation in the electrical output can include detecting variation in the current and current rate over time generated by the permanent magnet motor through the power transmission line and at least one separation transformer on the power transmission line. Monitoring electrical output can include monitoring electrical motor performance of the permanent magnet motor by monitoring current or current rate over time, and detecting variation in the electrical output can include detecting variation in the current or current rate over time due to transient load variations on the process side of the subsea pump and automatically adjusting the vector control parameters within the maximum current limitations. Monitoring electrical output can include monitoring electrical motor performance of the permanent magnet motor by monitoring current or current rate over time, and detecting variation in the electrical output can include detecting variation in the current or current rate over time due to transient load variations on the process side of the pump and automatically adjusting the vector control parameters to not exceed voltage limitations at the variable frequency drive terminals while following the load torque-speed settings. The multiphase variable speed drive can be an on-shore drive located remotely from the multiphase variable speed drive. The subsea permanent magnet motor can be connected to a subsea pump. The power transmission line can include a transformer. The subsea permanent magnet motor can be a sensorless subsea permanent magnet motor.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
   monitoring electrical output in a control loop from a variable speed drive to a remote permanent magnet motor, the variable speed drive electrically connected to the permanent magnet motor via a power transmission line;
   presetting, in a first step, a constant field frequency of a stator of the permanent magnet motor until a motor torque of the permanent magnet motor has exceeded a breakout torque of a rotor shaft of the permanent magnet motor;
   in response to detecting a variation in the electrical output at the variable speed drive, synchronizing a frequency of the rotor shaft of the permanent magnet motor with the constant electromagnetic field frequency of the stator of the permanent magnet motor for a predetermined period of time of at least a minimum time needed for the permanent magnet motor to overcome oscillations of the rotor shaft after exceeding the breakout torque of the rotor shaft;
   accelerating, in a second step, after reaching the predetermined period of time, the rotor shaft speed by increasing the electromagnetic field frequency of the stator up to a preset operational frequency threshold; and
   in response to reaching the preset operational frequency threshold of the electromagnetic field frequency of the stator, in a third step, determining an internal position of the relatively synchronized spinning rotor with respect to the variable electromagnetic field frequency.

2. The method of claim 1, wherein the permanent magnet motor has non-detectable rotor saliency due to un-detectable and un-measurable differences between direct and quadratic rotor inductances in the rotor reference frame.

3. The method of claim 1, wherein the permanent magnet motor is connected to a subsea pump.

4. The method of claim 3, wherein monitoring electrical output comprises monitoring electrical motor performance of the permanent magnet motor by monitoring current or current rate over time, and detecting variation in the electrical output comprises detecting variation in the current or current rate over time due to transient load variations on the process side of the subsea pump and automatically adjusting the vector control parameters within the maximum current limitations.

5. The method of claim 3, wherein monitoring electrical output comprises monitoring electrical motor performance of the permanent magnet motor by monitoring current or current rate over time, and detecting variation in the electrical output comprises detecting variation in the current or current rate over time due to transient load variations on the process side of the pump and automatically adjusting the vector control parameters to not exceed voltage limitations at the variable frequency drive terminals while following the load torque-speed settings.

6. The method of claim 1, wherein monitoring electrical output comprises monitoring current and current rate over time; and
   wherein detecting a variation in the electrical output comprises detecting a variation in the current and current rate over time at output terminals of an on shore power supply.

7. The method of claim 1, comprising supplying a continually increased current in time to the permanent magnet motor at the constant electromagnetic field frequency of the stator multiplied by the number of pairs of magnetic poles of the rotor, the continually increased current in time determined on the basis of the mechanical motor and pump parameters.

8. The method of claim 1, comprising determining a mechanical load value of the break out torque of the permanent magnet rotor based on the electrical output at the variable speed drive when the variation in the electrical output at the variable speed drive is detected.

9. The method of claim 8, wherein the constant electromagnetic field frequency of the stator is determined based on the mechanical motor and pump parameters and an estimated break out torque of the load.

10. The method of claim 8, wherein the predetermined period of time for the synchronization of the frequency of an unlocked rotor shaft of the permanent magnet motor with the constant electromagnetic field frequency of the stator is determined based on the mechanical load value of the break out torque and the mechanical motor and pump parameters.

11. The method of claim 10, wherein synchronizing the frequency of the rotor shaft of the permanent magnet motor with the constant electromagnetic field frequency of the stator comprises supplying, by the variable speed drive, a predetermined current value as function of time to the permanent magnet motor for the predetermined period of time, where the predetermined time period is based on a predetermined constant electromagnetic frequency, a maximum allowable current of the power transmission line, and the mechanical motor and pump parameters.

12. The method of claim 1, wherein monitoring electrical output comprises monitoring electrical motor performance of the permanent magnet motor by monitoring current and current rate over time, and detecting variation in the electrical output comprises detecting a variation in the current and current rate over time.

13. The method of claim 1, wherein the operational frequency threshold corresponds to a closed loop control of the permanent magnet motor, the operational frequency threshold based on a maximum allowable current of the power transmission line, a predetermined current value as a function of time and a predetermined frequency value increased as a function of time with an initial value for the frequency and an initial value for the current at its values at the end of the predetermined time interval.

14. The method of claim 1, wherein the control loop is a sensorless control loop, the method comprising, in response to reaching a reasonably stable rotor frequency at the operational frequency threshold, switching the sensorless control loop from an open control loop to a closed control loop.

15. The method of claim 1, wherein monitoring electrical output comprises monitoring electrical motor performance of the permanent magnet motor by monitoring current and current rate over time, and detecting variation in the electrical output comprises detecting variation in the current and current rate over time generated by the permanent magnet motor through the power transmission line and at least one separation transformer on the power transmission line.

16. The method of claim 1, wherein determining the predetermined period of time includes a minimum time required for the shaft oscillations to be damped.

17. The method of claim 1, wherein the predetermined period of time is determined based on the breakout torque, inertial moment of the permanent magnet motor, maximum allowable current values of the variable speed drive, and current ramp of the preset constant field frequency.

18. The method of claim 17, wherein the predetermined period of time, $t_{min}$, is defined as $$t_{min} = f\left(J, f_{start}, \frac{\Delta I_{a,b,c}}{\Delta t}\right),$$

wherein J is the inertial moment, $f_{start}$ is the constant shaft frequency, and $\Delta I_{a,b,c}/\Delta t$ is the current ramp over time.

19. A system, comprising:
a variable speed drive comprising output terminals to monitor an electrical signal over time;
a subsea permanent magnet motor coupled to a shaft;
a power transmission line electrically connecting the multiphase variable speed drive and the subsea permanent magnet motor; and
a process controller configured to transmit operational data of the shaft to the variable speed drive, the operational data comprising operational motor torque of the shaft;
wherein the output terminals monitor the electrical signal over time between the variable speed drive and the subsea permanent magnet motor to determine a position of the shaft of the permanent magnet motor, and
wherein the variable speed drive is configured to:
apply a constant electromagnetic field frequency to the motor until a motor torque of the permanent magnet motor has exceeded a breakout torque of a rotor shaft of the permanent magnet motor;
in response to detecting a variation in the electrical output at the variable speed drive, synchronize a frequency of the rotor shaft of the permanent magnet motor with the constant electromagnetic field frequency of a stator of the permanent magnet motor for a predetermined period of time of at least a minimum time needed for the permanent magnet motor to overcome oscillations of the rotor shaft after exceeding the breakout torque of the rotor shaft; and
accelerate, after reaching the predetermined period of time, the rotor shaft speed by increasing the electromagnetic field frequency of the stator up to a preset operational frequency threshold.

20. The system of claim 19, wherein the multiphase variable speed drive is an on-shore drive located remotely from the multiphase variable speed drive; and
wherein the subsea permanent magnet motor is connected to a subsea pump.

21. The system of claim 19, wherein the power transmission line comprises a transformer.

22. The system of claim 19, wherein the subsea permanent magnet motor is a sensorless subsea permanent magnet motor.

23. A method, comprising:
monitoring electrical output in an open control loop from a variable speed drive to a remote permanent magnet motor, the variable speed drive electrically connected to the permanent magnet motor via a power transmission line;
applying a constant field frequency on a rotor shaft of the permanent magnet motor until a motor torque of the permanent magnet motor exceeds a breakout torque of the rotor shaft;
in response to detecting a variation in the electrical output at the variable speed drive, synchronizing a frequency of the rotor shaft of the permanent magnet motor with the constant electromagnetic field frequency of a stator of the permanent magnet motor for a predetermined period of time of at least a minimum time needed for the permanent magnet motor to overcome oscillations of the rotor shaft after exceeding the breakout torque of the rotor shaft;
after the predetermined period of time, increasing the electromagnetic field frequency of the stator to an operational frequency threshold to accelerate the frequency of the rotor shaft of the permanent magnet motor; and
in response to reaching the operational frequency threshold, determining an internal position of the rotor based on the variable electromagnetic field frequency.

* * * * *